United States Patent
Skinner

[11] Patent Number: 5,809,662
[45] Date of Patent: Sep. 22, 1998

[54] TAPE MEASURE ASSEMBLY

[76] Inventor: Ronald R. Skinner, 14 Prince St., Danvers, Mass. 01923

[21] Appl. No.: 711,239

[22] Filed: Sep. 9, 1996

[51] Int. Cl.[6] .................................................. G01B 3/10
[52] U.S. Cl. .................................. 33/768; 33/42; 33/770
[58] Field of Search ............................... 33/768, 42, 758, 33/760, 761, 762, 769, 770

[56] References Cited

U.S. PATENT DOCUMENTS

| | | |
|---|---|---|
| Re. 27,496 | 10/1972 | Andrews . |
| 310,840 | 1/1885 | Millner . |
| 1,010,319 | 11/1911 | Robertson . |
| 1,257,683 | 2/1918 | Defenbaugh ................................ 33/42 |
| 1,323,742 | 12/1919 | Burroughs . |
| 2,563,674 | 8/1951 | Coots ........................................ 33/761 |
| 2,571,569 | 10/1951 | Greenwood . |
| 2,807,886 | 10/1957 | Aciego . |
| 3,148,455 | 9/1964 | Aciego . |
| 3,259,987 | 7/1966 | Wever . |
| 3,335,498 | 8/1967 | Barbee . |
| 3,364,581 | 1/1968 | Andrews . |
| 3,812,587 | 5/1974 | Elkins et al. ............................... 33/760 |
| 4,015,337 | 4/1977 | Taylor . |
| 4,044,469 | 8/1977 | Posey . |
| 4,106,201 | 8/1978 | Hansen . |
| 4,200,984 | 5/1980 | Fink . |
| 4,227,314 | 10/1980 | Schliep ..................................... 33/480 |
| 4,296,554 | 10/1981 | Hammerstrom . |
| 4,506,451 | 3/1985 | Hiltz ......................................... 33/451 |
| 4,542,589 | 9/1985 | Yamamoto . |
| 4,630,376 | 12/1986 | Pentecost . |
| 4,667,412 | 5/1987 | Carlson . |
| 4,700,489 | 10/1987 | Vasile ....................................... 33/342 |
| 4,760,648 | 8/1988 | Doak et al. ............................... 33/668 |
| 4,827,622 | 5/1989 | Makar ...................................... 33/770 |
| 4,890,393 | 1/1990 | St. Jean ................................... 33/768 |
| 4,914,830 | 4/1990 | Legaré ..................................... 33/668 |
| 4,964,225 | 10/1990 | Waldherr ................................. 33/768 |
| 4,965,941 | 10/1990 | Agostinacci ............................. 33/668 |
| 4,965,944 | 10/1990 | Kuze et al. .............................. 33/760 |
| 4,967,482 | 11/1990 | Hoover et al. ........................... 33/760 |
| 5,077,910 | 1/1992 | Smith ...................................... 33/760 |
| 5,092,057 | 3/1992 | Hoenig, Sr. .............................. 33/669 |
| 5,113,596 | 5/1992 | Meyers .................................... 33/770 |
| 5,154,006 | 10/1992 | Wooster ................................. 331/768 |
| 5,253,421 | 10/1993 | Landmark ............................. 33/27.03 |
| 5,295,308 | 3/1994 | Stevens et al. .......................... 33/770 |
| 5,349,760 | 9/1994 | DeVito ..................................... 33/760 |
| 5,390,426 | 2/1995 | Hull ......................................... 33/770 |
| 5,406,711 | 4/1995 | Graham ..................................... 33/42 |
| 5,416,978 | 5/1995 | Kaufman ................................. 33/770 |
| 5,430,952 | 7/1995 | Betts ....................................... 33/760 |
| 5,435,074 | 7/1995 | Holevas et al. .......................... 33/668 |
| 5,459,942 | 10/1995 | Hintz, Jr. ................................. 33/768 |
| 5,477,619 | 12/1995 | Kearns .................................... 33/668 |
| 5,481,810 | 1/1996 | Hastings et al. ........................ 33/484 |

*Primary Examiner*—Christopher W. Fulton
*Attorney, Agent, or Firm*—Mintz, Levin, Cohn, Ferris, Glovsky & Popeo, P.C.

[57] ABSTRACT

A tape measure assembly with a ridge that is disposed along an edge of its housing and is generally perpendicular to the housing's spooling axis. The ridge has a rigidly placed working surface oriented perpendicularly with respect to an outer surface of the housing that is normal to the spooling axis. At least two portions of the working surface extend beyond the outer surface in a direction parallel with the spooling axis, and the working surface and the outer surface define a volume that surrounds the intersection of two generally perpendicular planes. Angle measurement markings can be disposed along a second edge of the housing, a notch can be formed at a center defined by the angle markings adjacent the first edge, and/or a second edge can form a right angle with the intersection of the two generally perpendicular planes.

22 Claims, 2 Drawing Sheets

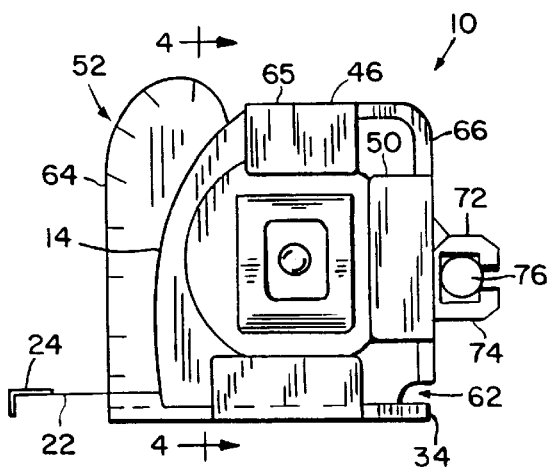
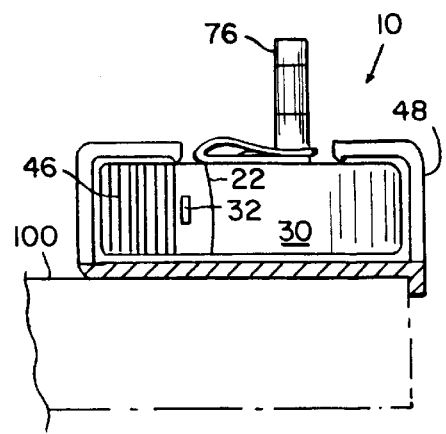
FIG.3       FIG.4
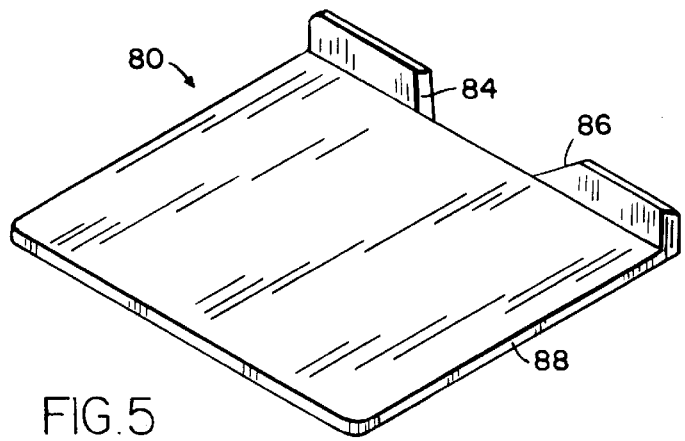
FIG.5
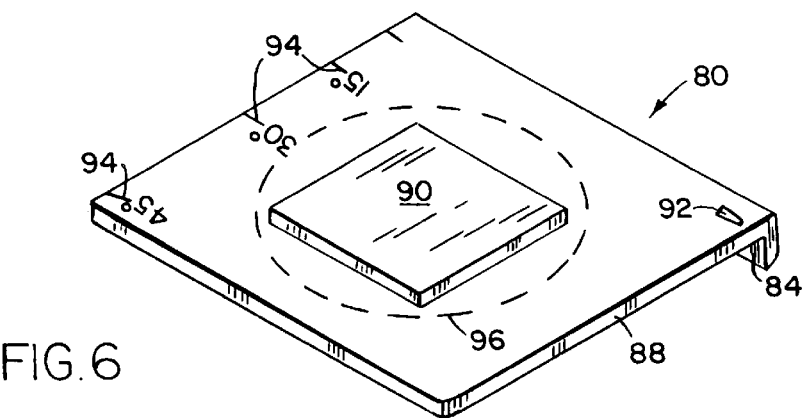
FIG.6

TAPE MEASURE ASSEMBLY

FIELD OF THE INVENTION

The present invention relates to a tape measure assembly that permits the measurement of right angles or other angles in addition to the measurement of lengths.

BACKGROUND OF THE INVENTION

Tape measures are probably the most frequently used measuring tools in carpentry, although other measuring tools are also commonly needed, particularly set squares and protractors. While attempts have been made to combine these measuring tools with tape measures, many of the resulting compound tools are cumbersome, impractical, or otherwise deficient. And none of them appears to have found widespread use in woodworking or in other trades.

SUMMARY OF THE INVENTION

In one general aspect, the invention features a tape measure assembly with a ridge that is disposed along an edge of its housing and is generally perpendicular to the housing's spooling axis. The ridge has a rigidly placed working surface oriented perpendicularly with respect to an outer surface of the housing that is normal to the spooling axis. At least two portions of the working surface extend beyond the outer surface in a direction parallel with the spooling axis, and the working surface and the outer surface define a volume that surrounds the intersection of two generally perpendicular planes.

In preferred embodiments, angle measurement markings can be disposed along a second edge of the housing, a notch can be formed at a center defined by the angle markings adjacent the first edge, and/or a second edge can form a right angle with the intersection of the two generally perpendicular planes. A detachable portion bearing the ridge can be attached to the housing, and an attachment mechanism can be mounted on the detachable portion to attach it to remaining portions of the tape measure assembly. The detachable portion can include a generally planar area perpendicular to the plane of the ridge, and the ridge can be retractable in to the housing. The attachment mechanism can include clips mounted on the planar area. The blade opening can be adjacent another edge, generally parallel to and opposite the first edge. A pen clip can be attached to the housing, and this pen clip can be oriented to hold a pen parallel with the spooling axis. The overall area of the tape measure assembly, at its widest point viewed from the spooling axis, can be less than about twice the area of the coil when the tape is fully retracted.

In another general aspect, the invention features an attachment for a tape measure that includes a generally rectangular plate having a ridge mounted on the plate and being rigidly placed in an orientation that is generally perpendicular to a first side of the plate. The ridge has a working surface, and at least a portion of the working surface extends beyond the remaining parts of the plate. The attachment also includes an attachment mechanism mounted on a second side of the plate, to attach the second side of the plate to a side of the tape measure.

In preferred embodiments, an edge of the plate can be perpendicular to the ridge, angle markings can be provided along the second edge, and/or a center notch can be cut out of the plate adjacent the ridge. The attachment can be constructed to leave the blade opening unobstructed when it is attached to the tape measure, and the attachment mechanism can include clips.

In a further general aspect, the invention features a method of defining positions for marking a work piece using a tape measure assembly. The method includes holding at least a portion of a tape measure blade in a coil about a spooling axis in a housing of the tape measure assembly, and contacting a working surface of a ridge of the tape measure assembly to an end of the work piece, where the working surface extends in a direction generally perpendicular to the spooling axis. Two reference points are provided on a surface of the work piece that is normal to the spooling axis and perpendicular to the plane of the end of the work piece.

In preferred embodiments, the two points can be in alignment with an edge of the tape measure assembly that is perpendicular to the edge of the work piece, and/or they can be in alignment with a line that is at an acute angle with respect to the edge of the work piece. The method can also include a step of extracting the blade from the tape measure assembly, which overlaps in time with the step of providing.

Embodiments of tape measure assemblies according to the invention can be advantageous in that they permit a carpenter to make a variety of additional measurements and marks, such as right angle cut lines or acute angle cut lines, without requiring him or her to carry additional instruments or a cumbersome tape measure attachment. This can save the carpenter time walking to and from his tool chest or truck, and it may also help to avoid the temptation to "eyeball" a cut, since an appropriate tools is always available. The result is that embodiments according to the invention can make a carpenter's work more efficient, and may even improve its quality. Embodiments according to the invention can be made to be simple and lightweight, while adding very little bulk to a tape measure, and without requiring any moving parts. In certain instances, the tape measure assembly may also allow the carpenter to make measurements using the assembly's ridge as a second end hook.

BRIEF DESCRIPTION OF THE DRAWINGS

FIG. 3 is a side view of the embodiment of FIG. 1;

FIG. 4 is an end-view cross-section of the embodiment of FIG. 1 oriented as shown in line 4—4 of FIG. 3;

FIG. 5 is a perspective diagram of a variant of the embodiment of FIG. 1; and

FIG. 6 is a second perspective view of the variant of FIG. 5 in a position rotated 180° from its position in FIG. 5.

DETAILED DESCRIPTION

Figure 1:
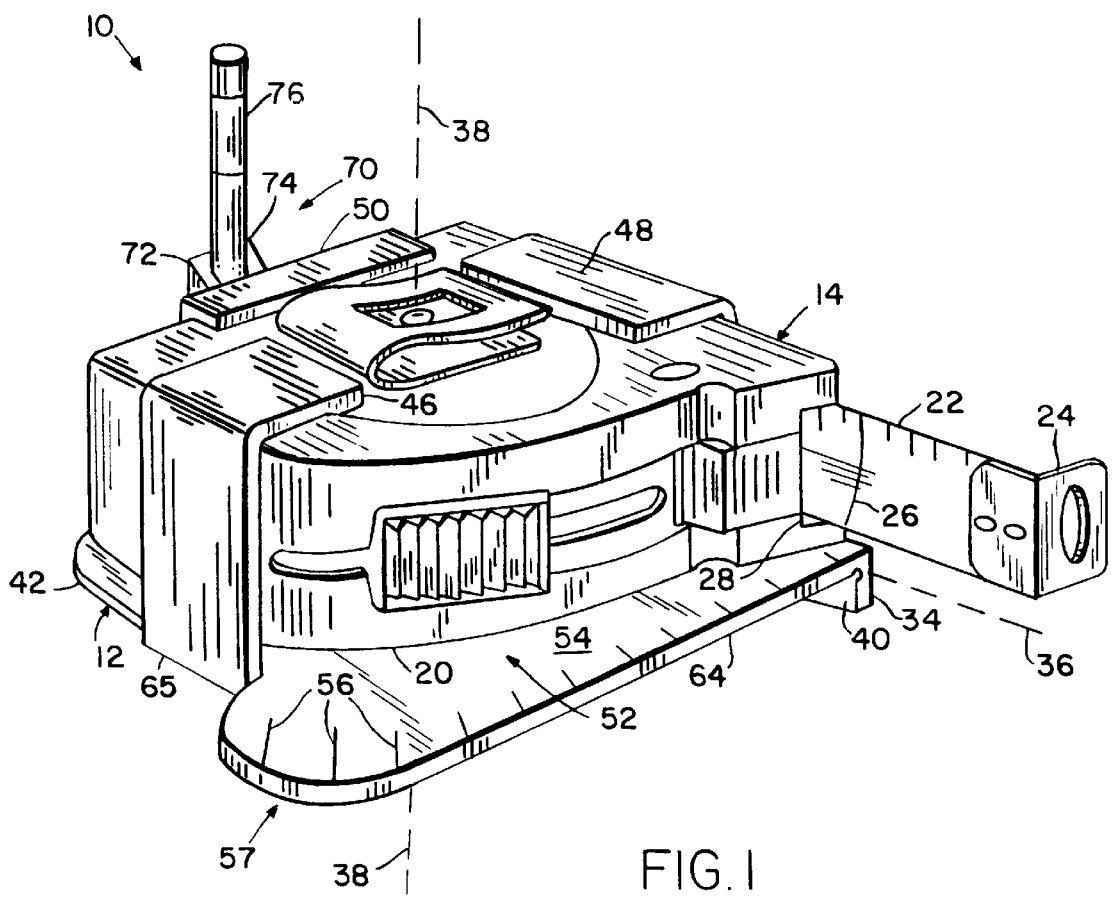
FIG. 1 is a perspective view showing an embodiment according to the invention from an elevated vantage point.
Figure 2:
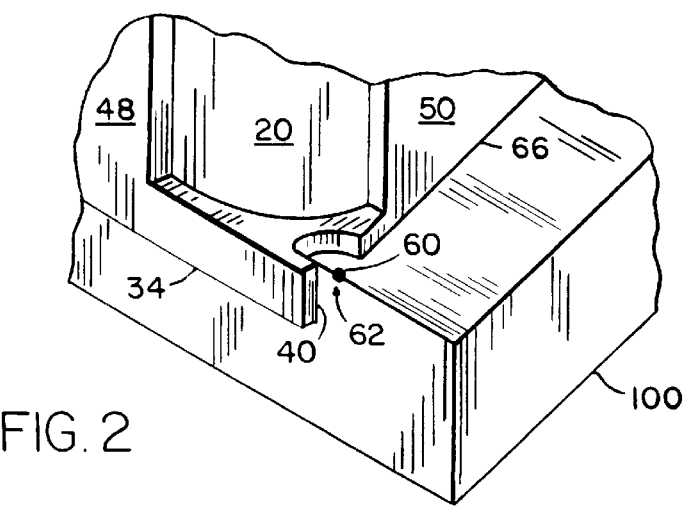
FIG. 2 is a partial perspective view of the embodiment of FIG. 1, from another elevated vantage point opposite the one used for FIG. 1.

Referring to FIGS. 1–4, an illustrative embodiment of the invention includes a tape measure assembly 10 that can comprise a tape measure accessory 12 attached to a standard tape measure 14. Alternatively, the assembly can include a special-purpose tape measure with the additional features of the accessory incorporated into its housing.

As is well known, a tape measure 14 generally includes a housing 20, a blade 22, and an end hook 24 attached to one end of the blade. The blade passes through a blade opening 28 in the housing, and has marks 26 along its length, typically at regular intervals. The end of the blade opposite the end hook is a generally attached, such as by interlocking notches 32, to a retraction mechanism, which is typically a spring 30 (see FIG. 4). Other types of retraction mechanisms, such as cranks, are used in place of a spring in some tape measures, and the shapes and sizes of the housings of tape measures vary, with some housings only partially surrounding the coiled tape. It is contemplated that embodiments of the invention can be designed to suit a wide variety of tape measure designs.

The tape measure assembly 10 includes a ridge 34 that is mounted along a first edge of the housing 20 whose axis 36 is generally perpendicular to a spooling axis 38 of the tape measure 14. A flat working surface 40 is oriented on one side of the ridge in a plane generally parallel to the spooling axis 38. The ridge can be attached to the tape measure housing itself, or it can be attached to a plate 42, which is attached to the tape measure by an attachment mechanism, which can include clips 46, 48, 50. The ridge can also be retractable into the assembly, such as by sliding or pivoting as shown in phantom in FIG. 4, although it should be mounted to the housing such that it can be placed in a rigid relationship with respect to the housing at least when measurements are to be performed.

A protractor area 52 is provided on a surface 54 of the plate 42 (or a corresponding housing portion) that is oriented in a plane normal to the spooling axis 38. The angle markings face away from the ridge 34. The protractor area includes a series of angle marks 56 along a second edge 64 adjacent the first edge and/or a third edge 65 opposite the first edge. Each angle mark indicates an angle between the axis 36 of the first edge, and a line joining that angle mark with a center or apex 60 (see FIG. 2). A notch 62 is cut out of a fourth edge 66 of the plate opposite the second edge 64 with respect to the ridge in such a way as to surround the location of the apex 60. Note that a curved corner 57 between the second and third edges tends to make measurement of angles around 45° somewhat more precise.

One or both of the second and fourth edges 64, 66, which are both adjacent the ridge 34, can define a right angle with respect to the axis 36 of the first edge, and a pencil clip can be attached to the tape measure 14, to the plate 42, or to the attachment mechanism (e.g., to one of the clips 50). The pencil clip 70 includes two resilient jaws 72, 74, which hold a pen or pencil 76 in an orientation that is generally parallel to the spooling axis 38, at a predetermined distance from the ridge. The pencil clip may be slidably mounted so that its distance from the ridge can vary, and it can also be made to pivot so that the pen can point in a direction perpendicular to the spooling axis.

Referring to FIGS. 5 and 6, in a variant, a tape measure accessory 80 includes a plate 88 that has a two-part ridge made up of first and second ridge portions 84, 86 that extend away from a first side of the plate along a first of its edges. The ridge portions have an inward-facing working surface, which is disposed in a plane that is generally perpendicular to the plane of the plate. The working surface extends beyond the remaining portions of the assembly, to allow it to bear against an edge, such as a board edge.

The working surface does not need to be continuous, but its orientation should be defined by at least two points. The edge does not need to be continuous either, but it should also serve to define the position of the two points. Similarly, the plate does not have to be continuous, but should include at least portions that define a generally planar surface on the first side of the plate.

On a second side of the plate, an adhesive 90, such as a piece of foam tape, is provided to attach the accessory 80 to a tape measure. A center mark 92 is provided on a second edge of the plate 88 at one end of the ridge directly above the working surface, and angle markings 94 are provided on a third edge opposite the outer mark. The angle markings can also extend onto a fourth edge of the plate opposite the ridge. A detachable coupling such as a hook-and-loop fastener can be used in place of the adhesive.

Preferably, the overall size of the accessory does not expand the size of the tape measure assembly much. It should be generally rectangular or otherwise generally match the shape of the tape measure. And it should not extend the area of the tape measure assembly, at its widest point viewed from the spooling axis, by more than about 50%, with 25% or less being preferable. Where the capabilities of the accessory are built into the housing, the overall area of the tape measure accessory should not be significantly larger than twice the area of the tape in its spooled-up position within the housing, with 50% or less being preferable.

In operation, referring to FIGS. 1–6, a carpenter employing the improved tape measure assembly 10 may use it in much the same way he or she would have used a tape measure not equipped with features according to the invention, but he or she can also use it to mark right angles and other acute angles. To mark a right angle, the carpenter orients the tape measure assembly 10 with the surface of the plate beyond which the ridge extends held downwardly, rests it onto a surface of an object to be measured, such as a board 100, and aligns the working surface 40 of the ridge 34 against the end of the board (see FIGS. 2 and 4). Put in geometric terms, the working surface and the surface of the plate from which the ridge extend together define a volume outside the housing that surrounds the intersection of two generally perpendicular planes, which can be the planes of the top and end of the board. The front and/or rear edges 64, 66 will now be precisely perpendicular to the edge of the board, so the carpenter can simply scribe a straight line along one of those edges, and this line will be at a right angle with respect to the edge of the board. For small stock, such as moldings, this line may suffice as a cut line for the full width of the board. By switching to the other edge of the board and marking two lines, the tape measure assembly can be used to provide a cut line across a board that is as much as twice the width of the plate, although this cut line may not be straight if the board is warped or otherwise not rectangular. With larger boards, scribed right angles drawn from each edge may suffice as a starting point for a rough cut, or the gap between them can be filled in using part of the assembly as a straight edge.

The tape 22 can be used to determine the positions of the right angle lines. A line can even be scribed without moving the tape measure after the position of a desired right angle is determined. In particular, if the tape measure opening is unobstructed by the accessory when it is in its operating position, the tape can be extended to the end of the board while the tape measure assembly rests on the board in its scribing position. If the tape opening 28 is adjacent the edge of the tape measure assembly 10 that is being used to scribe the right angle marks, the measurement will be measured from the same point as it usually is. By locking the tape, a carpenter can also scribe the same line repeatedly on a series of boards, with each line being at the same distance from the end of its respective board.

To mark angles other than 90°, the carpenter begins by aligning the notch 62 with the apex or center 60 of the desired angle and marks it, if it is not already marked. He or she can then make a second mark in alignment with the angle mark 56 corresponding to the desired angle magnitude. Typically the available angles will range from 0° to 45°, if only one edge is marked. Once the carpenter has made his or her marks, a straight line can be drawn between the center mark 60 and the second mark. This line may be traced with another straight edge, or an edge of the tape measure assembly, such as the ridge 34. To facilitate tracing lines for angles, the ridge can be made to be somewhat longer than the edge to which it is connected. Note that the angle marks on the tape measure assembly can also be used to measure unknown angles defined by preexisting lines.

If the tape measure 14 is oriented with respect to the ridge 34 such that the tape 22 extends outwardly in a direction normal to the plane of the working surface 40, the ridge 34 can act as a useful second end hook. By placing the working surface against the end of a long board to be measured, an individual carpenter can pull the tape out and hook the end hook 24 on the other end of the board, and then return to the tape measure to read the length of the board. In some instances, this type of operation may permit an individual carpenter to measure relatively long boards without having to rely on the friction between the small hook and the board end while the tape is being retracted. This method of operation is less likely to result in the end hook slipping off the end of the board and retracting into the tape measure. To allow the tape measure assembly 10 to be used in this manner, it is preferable to design the position of the working surface 40 to correspond exactly with the position of the rear edge of the tape measure, so that the tape measure's "inside measurement" number can be added to the number obtained from the tape.

Some measurements are made from an edge that is not perpendicular with the direction of the measurement. For this reason, embodiments of the invention advantageously permit the tape measure to pivot with respect to the plate, so the ridge can be used as a slanted end hook. This may be achieved by mounting the attaching mechanism, such as the adhesive 90, on a turntable 96 in the plate 88 (see FIGS. 5 and 6).

The pen clip 70 can allow a carpenter to draw lines parallel to the edge of a board 100, or to draw segments of circles. To draw a line parallel to the edge of the board, the tape measure assembly 10 can be slid along the end of the board, with the working surface 40 kept in alignment with the end of the board. This will result in the pen marking a line parallel to the board end, at a distance from the end defined by the position of the pen clip. By slidably mounting the pen clip on the assembly or adjusting the turntable 96, this distance can be varied. With the blade 22 locked, it is also possible to draw lines further from the board edge in a similar manner using the end hook as a guide, instead of the ridge. This can be done by twisting the tape, or orienting the pen clip at an angle that is perpendicular to the length of the blade. To draw circular segments, the end hook can be hooked to a nail or other protrusion, with the blade locked, and the assembly can then be moved through an arc in such a way as to keep the blade extended from the nail while maintaining the pen 76 on the surface to be marked.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. A tape measure assembly, comprising:
   a tape measure assembly housing, having a spooling axis, a blade opening, and a first outer wall having at least portions defining a first outer surface normal to the spooling axis,
   an elongated blade having a first end, a second end, and measurement marks disposed at intervals between the first and second ends, the blade passing through the blade opening and being slidably extractable from the housing to measure distances between the first end and the housing,
   a retraction mechanism attached to the second end of the blade for retracting the blade into the housing in a coil that surrounds the spooling axis of the housing,
   a ridge mounted on the housing and disposed along a first edge of the housing, which first edge is in an orientation that is generally perpendicular to the spooling axis of the housing, the ridge having a rigidly placed working surface oriented perpendicularly with respect to the first outer surface, wherein at least two portions of the working surface extend beyond the first outer surface in a direction parallel with the spooling axis, and wherein the working surface and the first outer surface define a volume outside the housing that surrounds the intersection of two generally perpendicular planes, and
   an accessory portion of the tape measure assembly extending from the tape measure assembly housing at the first outer surface and facing away from the ridge.

2. The tape measure assembly of claim 1 wherein the housing further includes a plurality of angle measurement markings disposed along a second edge of the housing.

3. The tape measure assembly of claim 2 wherein the housing further includes a notch formed therein at a center that is defined by the angle markings and is adjacent the first edge.

4. The tape measure assembly of claim 3 wherein the housing includes a second edge that forms a right angle with the intersection of the two generally perpendicular planes.

5. The tape measure assembly of claim 1 wherein the housing includes a second edge that forms a right angle with the intersection of the two generally perpendicular planes.

6. The tape measure assembly of claim 1 wherein the housing includes a detachable portion bearing the ridge and attached to the housing, and an attachment mechanism mounted on the detachable portion to attach the detachable portion to remaining portions of the tape measure assembly.

7. The tape measure assembly of claim 6 wherein the detachable portion includes a generally planar area perpendicular to the plane of the ridge, the planar area incorporating the first edge, and wherein the attachment mechanism includes a plurality of clips mounted on the planar area.

8. The tape measure assembly of claim 1 wherein the blade opening is adjacent a second edge, which second edge is generally parallel to and opposite the first edge.

9. The tape measure assembly of claim 1 wherein the ridge is retractable in to the housing.

10. The tape measure assembly of claim 1, further including a pen clip attached to the housing.

11. The tape measure assembly of claim 1 wherein the overall area of the tape measure assembly, at its widest point viewed from the spooling axis, is less than about twice the area of the coil, viewed from the spooling axis when the tape is fully retracted.

12. The attachment of claim 1, wherein the accessory portion of the tape measure assembly includes angle markings facing away from the ridge.

13. The attachment of claim 1, wherein the accessory portion of the tape measure assembly has an area that is less than about 50% of an area of the first outer surface.

14. The attachment of claim 1, wherein the portion of the plate has an area that is less than about 50% of an area of the side of the tape measure.

15. A tape measure assembly, comprising:

a tape measure assembly housing, having a spooling axis, a blade opening and a first outer wall having at least portions defining a first outer surface normal to the spooling axis, an elongated blade having a first end, a second end, and measurement marks disposed at intervals between the first and second ends, the blade passing through the blade opening and being slidably extractable from the housing to measure distances between the first end and the housing, a retraction mechanism attached to the second end of the blade for retracting the blade into the housing in a coil that surrounds the spooling axis of the housing, a ridge mounted on the housing and disposed along a first edge of the housing, which first edge is in an orientation that is generally perpendicular to the spooling axis of the housing, the ridge having a rigidly placed working surface oriented perpendicularly with respect to the first outer surface, wherein at least two portions of the working surface extend beyond the first outer surface in a direction parallel with the spooling axis, and wherein the working surface and the first outer surface define a volume outside the housing that surrounds the intersection of two generally perpendicular planes, and a pen clip attached to the housing, wherein the pen clip is oriented to hold the pen parallel with the spooling axis of the housing.

16. An attachment for a tape measure that includes a marked, elongated blade passing through a blade opening in its housing, and a retraction mechanism attached to the blade for retracting the blade into the housing in a coil that surrounds a spooling axis of the housing, comprising:

a plate having first and second sides and a plurality of edges, a ridge mounted on the plate and being rigidly placed in an orientation that is generally perpendicular to the first side of the plate, wherein the ridge has a working surface, with at least a portion of the working surface extending beyond the remaining parts of the plate, an attachment mechanism mounted on the plate for attaching the plate to a side of the tape measure, and wherein at least a portion of the second side of the plate extends beyond an edge of the side of the tape measure and faces away from the ridge when the plate is attached to the tape measure.

17. The attachment of claim 16, wherein a first edge of the plate is perpendicular to the ridge.

18. The attachment of claim 17, wherein the plate further includes angle markings on one of the sides of the plate along the first edge.

19. The attachment of claim 18, wherein the plate further includes a center notch cut out of the plate adjacent the ridge.

20. The attachment of claim 19, wherein the attachment is constructed to leave the blade opening unobstructed when the attachment is attached to the tape measure.

21. The attachment of claim 19, wherein the attachment mechanism includes a plurality of clips for attachment to the housing.

22. The attachment of claim 16, wherein the portion of the plate is a generally flat portion including angle markings on the second side of the plate.

* * * * *